United States Patent [19]

Kondo et al.

[11] Patent Number: 4,507,666

[45] Date of Patent: Mar. 26, 1985

[54] THERMAL HEAD SUPPORTING MECHANISM

[75] Inventors: Kouichi Kondo; Tadashi Tamura, both of Hanamaki, Japan

[73] Assignee: Kabushiki Kaisha Sato, Japan

[21] Appl. No.: 391,299

[22] Filed: Jun. 24, 1982

[30] Foreign Application Priority Data

Jul. 15, 1981 [JP] Japan .......................... 56-103785[U]

[51] Int. Cl.[3] ..................... G01D 15/10; G01D 15/16; B41J 3/20

[52] U.S. Cl. .......................... 346/76 PH; 346/139 C; 400/120

[58] Field of Search .............. 346/139 C, 76 PH, 145; 400/120

[56] References Cited

U.S. PATENT DOCUMENTS

| | | | |
|---|---|---|---|
| 3,192,534 | 6/1965 | Blakeslee et al. | 346/145 |
| 3,266,048 | 8/1966 | Schweitzer | 346/145 |
| 4,134,696 | 1/1979 | Hanakata et al. | 400/323 |
| 4,228,441 | 10/1980 | Rhine | 346/139 C |
| 4,297,039 | 10/1981 | Lees | 400/120 |

*Primary Examiner*—E. A. Goldberg
*Assistant Examiner*—Gerald E. Preston
*Attorney, Agent, or Firm*—Ostrolenk, Faber, Gerb & Soffen

[57] ABSTRACT

A thermal head supporting mechanism for use on a thermal printer is disclosed. A thermal head cooperates with a platen supported on the body of the printer. A head frame hinged to the body of the printer supports the thermal head through a plurality of leaf springs connecting the head frame and the thermal head for enabling the thermal head to tilt with respect to the head frame. A pair of adjustment screws in the head frame operates through pressure springs upon the thermal head and adjustment of the screws adjusts the pressure of the thermal head and its parallel relationship with the platen. A control lever hinged to the body of the printer includes recesses which permit the head frame to be moved toward and away from the platen. An auxiliary roller is carried on the head frame by leaf springs and the auxiliary roller presses a printing medium against the platen.

24 Claims, 5 Drawing Figures

THERMAL HEAD SUPPORTING MECHANISM

BACKGROUND OF THE INVENTION

1. Field of the Invention

The present invention relates to a printer of the thermal transfer type or of the type which uses heat-sensitive paper and, more particularly, relates to a thermal head supporting mechanism for supporting the thermal head of the printer.

2. Description of the Prior Art

The thermal head is usually equipped with an elongated printing block comprising a plurality of exothermic elements arranged in a row. If that entire printing block is not forced into uniform contact with printing paper, a print blur may occur, wherein one side of the imprint is dense, while the other side is left thin or blank. Furthermore, the exothermic elements at the excessively pressed portion may become worn.

Therefore, the printing surface of the thermal head and a platen for supporting the printing paper which is contacted by the thermal head must be held parallel to each other at all times during thermal printing. In the prior art, a mechanism for that purpose has the thermal head supported by means of a shaft so that it can be turned in a horizontal plane, thereby permitting the printing surface to be held to the platen at all times. However, this conventional mechanism is so complicated that it raises the production cost for the printer.

SUMMARY OF THE INVENTION

It is, therefore, an object of the present invention to provide a thermal head supporting mechanism which is able to force the printing surface of a thermal head to contact a printing medium under a uniform pressure at all times, and to finely adjust that pressure.

The present invention provides a thermal head supporting mechanism for use in a thermal printer. The printer includes a platen for supporting a printing medium. The thermal head is juxtaposed parallel to the platen and is adapted to be brought into and out of contact with the platen through the printing medium. The thermal head supporting mechanism comprises a head frame hinged at one end to the body of the thermal printer. Elastic means elastically support the thermal head on one side of the head frame in a manner to change the tilt relationship of the thermal head with respect to the platen. Adjusting means adjusts the tilt relationship to achieve a desired parallelism between the printing surface and the platen and also adjust the contact pressure of the thermal head upon the printing medium. Control means enable the head frame to be pivoted to move the thermal head toward and away from the platen.

Other objects and features of the present invention will become apparent from the following description taken in conjunction with the accompanying drawings.

DESCRIPTION OF THE PREFERRED EMBODIMENT

Figure 2:
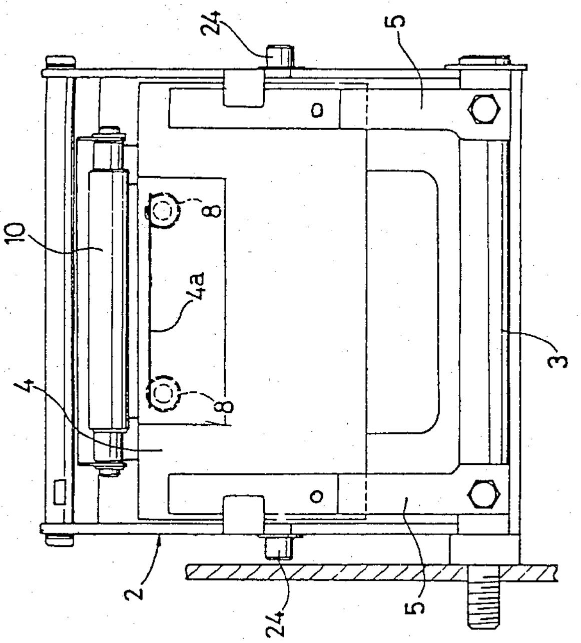
FIG. 2 is a front elevational view showing the head frame of the thermal head supporting mechanism.

Referring to the drawings, a thermal head supporting mechanism exemplifying the present invention is used with a thermal transfer type thermal printer. There is a platen roller 1 which is connected to a driving power source (not shown) and is supported in position to the body 50 of the printer. A head frame 2, which is able to swing back and forth, is juxtaposed to the platen roller. The head frame 2 has its lower end hinged to a shaft 3, and that shaft is secured to the body 50 of the thermal printer. The front side of the frame 2, which faces platen roller 1, elastically supports a thermal head 4 by means of elastic means comprising a pair of leaf springs 5. The leaf springs 5 are fixed to both end portions of the front side of the thermal head 4 and extend down from the thermal head toward the lower ends of the leaf springs, which are fixed to the lower ends of the front side of the head frame 2. The head frame extends up behind the thermal head.

The elastic means for supporting the thermal head need not be limited to the paired leaf springs 5 but can be exemplified by a single leaf spring or by three or more leaf springs.

A pressure adjuster 6 adjusts the pressure of the thermal head 4 upon the platen roller 1. The pressure adjuster 6 includes a pair of adjust screws 7, which are tightened in the head frame 2 at a location on the head frame spaced above the shaft 3, and a pair of respective pressure springs 8 which are sandwiched between the leading ends of the corresponding adjust screws 7 and the back side of the thermal head 4.

A roller holder 9 holds an auxiliary roller 10 in a rotatable manner. The auxiliary roller is oriented parallel to the platen. The roller holder 9 is integrally formed with a pair of leaf springs 11 at its lower portion. These leaf springs 11 have rear or bottom ends which are fixed to the head frame 2. The auxiliary roller 10 is biased by the leaf springs 11 to press its outer circumference onto the outer circumference of the platen roller 1 through a printing medium.

The printing medium includes a web of printing paper 12, which is comprised of a series of labels of paper and a heat transfer ribbon 13 which bears heat-sensitive carbon, or the like. The printing paper web 12 and heat transfer ribbon 13 are laminated as they pass over the platen roller 1 so that the printing paper web 12 is printed with predetermined indicia from the printing block **4*a* of the thermal head 4. The printing block 4*a* is arranged with a transverse row of a plurality of exothermic elements, which generate heat in response to commands from a control unit (not shown) of the printer body so that the ink of the heat transfer ribbon 13 is transferred to print the printing paper web 12** with the indicia.

Figure 1:
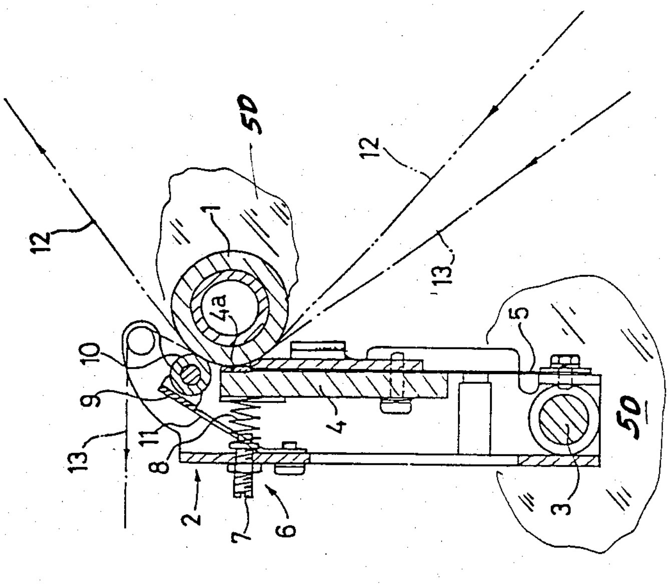
FIG. 1 is a sectional view showing a portion of a thermal head supporting mechanism embodying the present invention.
Figure 3:
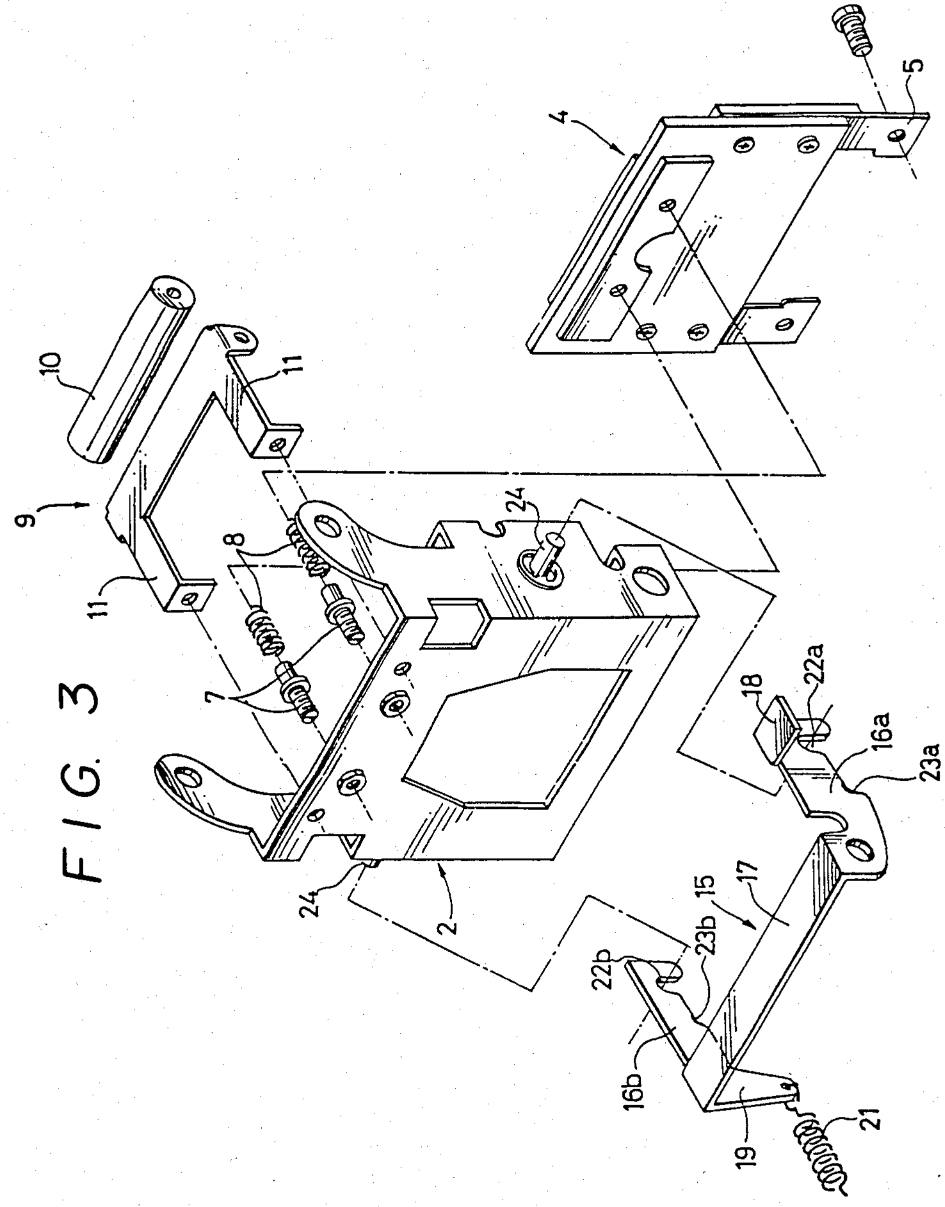
FIG. 3 is an exploded perspective view showing the major parts of the thermal head supporting mechanism.
Figure 5:
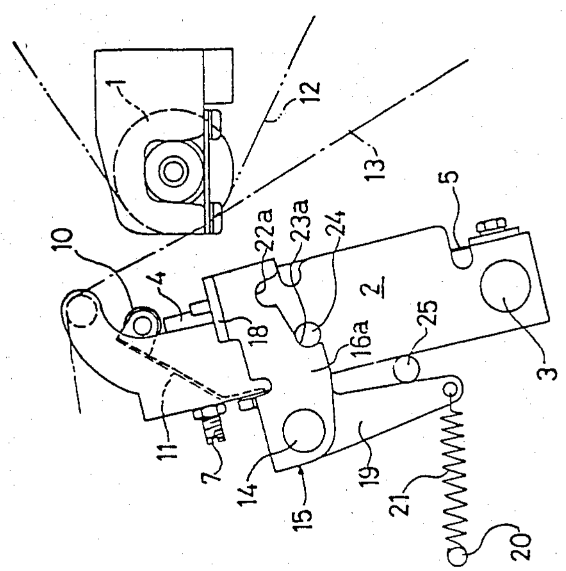
FIG. 5 is also a side view, but showing the head frame opened.
Figure 4:
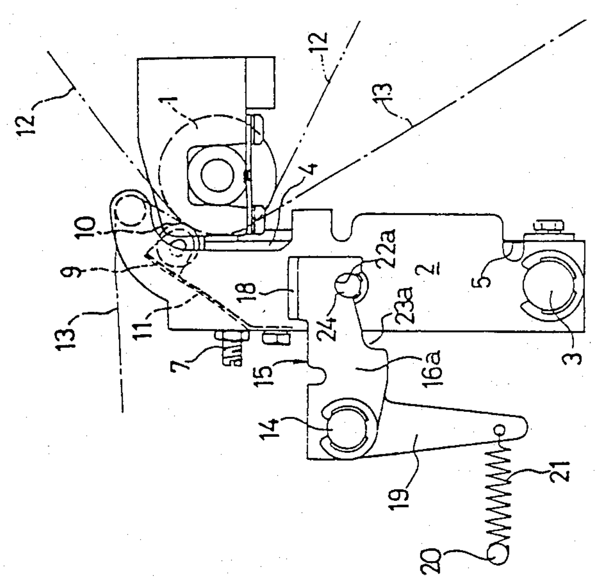
FIG. 4 is a side view showing the thermal head supporting mechanism with its head frame closed.

Next, the control mechanism for opening and closing the head frame 2 is described. The head frame 2 is closed during the printing operation. During the setting, or the like, of the printing paper web 12 and/or the thermal transfer ribbon 13, before the printing operation, on the contrary, the head frame 2 is opened. In the control mechanism, a control lever 15, which is hinged to the printer body 50 by means of a pin 14, closes the head frame by forcing the printing block 4a of the thermal head 4 to contact the printing medium (as shown in FIGS. 1 and 4). The control lever 15 opens the head frame by separating the printing block 4a from the platen roller 1 (as shown in FIG. 5). As seen in FIG. 3, the control lever 15 includes a pair of spaced apart side plates 16a and 16b at both sides and a cross plate 17 which connects the side plates 16a and 16b. One plate 16a is formed with a knob 18 at its front end, while the other plate 16b is formed with a depending portion 19 at its rear end. A coil spring 21 is retained between the lower end of the depending portion 19 and a pin 20 fixed to the printer body. The spring is tensioned to urge the control lever 15 as a whole in the clockwise direction. Both side plates 16a and 16b are formed at their respective lower edges with a pair of more forward, first engagement recesses 22a and 22b and a pair of more rearward, second engagement recesses 23a and 23b. Both pairs of recesses are sized and positioned to enable one of the pairs of recesses at a time to simultaneously engage a pair of lock pins 24, which are formed to protrude from both the sides of the head frame 2, so that the head frame 2 may be locked in its closed and opened positions, respectively.

The operation of the thermal head supporting mechanism according to the present invention is now described. FIGS. 1 and 4 show the printing state. The lock pins 24 are in engagement with the first engagement recesses 22a and 22b of the control lever 15 so that the printing block 4a of the thermal head 4 is forced into contact with the heat transfer ribbon 13 to print the printing paper web with predetermined indicia. During this printing state, if the parallelism between the printing block 4a on the printing surface and the platen roller 1, where it is in contact with the block 4a, is lost so that the printing block 4a is forced into contact with the heat transfer ribbon 13 while the block is inclined with respect to the surface of the platen roller 1, then the imprint to be made on the printer paper web 12 becomes so irregular that it is thinned at one side, or not even effected at its worst. This can be remedied by the action of the pressure adjuster 6. Specifically, if the thermal head 4 is pressed through the pressure spring 8 by turning the corresponding adjust screw 7, the printing surface of the printing head can easily restore its parallelism with the platen roller 1 as a result of the elastic deformations of the leaf springs 5 which support the printing head.

The pressure adjuster 6 can be used not only to remedy any lack of parallelism but also to finely adjust in a usual manner the pressure of the thermal head 4 upon the platen roller 1.

Next, to open the head frame 2 to bring the thermal head 4 away from the platen roller 1, the knob 18 of the control lever 15 is manually pulled up to release the engagement between the first engagement recesses 22a and 22b at the lower edges of said lever 15 and the lock pins 24 of the head frame 2. The leaf springs 11 of the roller holder 9, acting through the auxiliary roller 10 pressing upon the platen roller 1 and through the printing medium, press the roller 10 against the platen roller 1. This repulsive force causes the head frame 2 to be swung counterclockwise to bring the lock pins 24 into engagement with the second engagement recesses 23a and 23b of the control lever 15 until the head frame is locked at the state shown in FIG. 5. At this state, the depending portion 19 of the control lever 15 abuts against a stopper 25 formed on the printer body, which blocks the control lever from swinging any further counterclockwise.

In order that the head frame 2 may be closed from the opened state to the printing state, the frame 2 is manually pushed toward the platen roller 1. Then, the lock pins 24 are disengaged, without any resistance, from the second engagement recesses 23a 23b of the control lever 15, because those recesses 23a ad 23b are quite shallow, so that the head frame 2 is returned to the position of FIG. 4 until the thermal head 4 is forced to contact with the printing medium. Meanwhile, the control lever 15 is swung clockwise by the spring 21 so that its first engagement recesses 22a and 22b again engage with and lock on the lock pins 24.

As has been described hereinabove, the present invention is equipped with the means for elastically supporting the thermal head so that it can partly change and remedy the parallelism of the thermal head with the platen and partly adjust the pressure of the thermal head upon the printing medium. As a result, the printing pressure, which is proper and uniform all over the surface, can be established at all times by the use of a remarkably simple mechanism, thereby to ensure a clear imprint and to reduce the production cost for the printer.

Although the embodiment thus far described is directed to a thermal transfer printer, the present invention should not be so limited but it can naturally be applied to any thermal printer using heat-sensitive paper.

Although the present invention has been described in connection with a preferred embodiment thereof, many variations and modifications will become apparent to those skilled in the art. It is preferred, therefore, that the present invention be limited not by the specific disclosure herein, but only by the appended claims.

What is claimed is:

1. A thermal head supporting mechanism for a thermal printer, wherein the printer comprises a platen supported in position on a body and a platen is for supporting a printing medium as the printing medium is being contacted by a thermal head; the platen extending along a direction;

a thermal head supported on the body and being adapted to be brought into and out of contact with the printing medium supported on the platen;

the thermal head supporting mechanism comprising:

a head frame for supporting the thermal head, the head frame being movable to move the thermal head to contact the printing medium supported on the platen;

elastic means on the head frame for elastically supporting the thermal head for permitting the tilt orientation of the thermal head to be adjusted with respect to the direction of the extension of the platen for enabling the thermal head to be tilted parallel to the platen;

adjusting means on the head frame for adjusting the tilt orientation of the thermal head with respect to the platen for adjusting the contact pressure of the thermal head against a printing medium supported on the platen;

the thermal head supporting mechanism also comprising control means attached to the body of the printer for selectively holding the head frame in a closed position to urge the thermal head to press against the printing medium supported on the platen and for selectively holding the head frame in an open position at which the thermal head is apart from the platen.

2. The thermal head supporting mechanism of claim 1, wherein the head frame is hingedly attached to the body of the printer to pivot with respect to the body for moving the thermal head toward and away from contact with the platen.

3. The thermal head supporting mechanism of claim 2, wherein the head frame extends behind the thermal head at the side of the thermal head away from the platen; the adjusting means comprises a pair of adjusting elements spaced apart along the platen direction of extension and each adjusting element extends from the head frame toward the thermal head and is movable with respect to the head frame for moving the thermal head with respect to the head frame.

4. The thermal head supporting mechanism of claim 2, wherein the head frame extends behind the thermal head at the side of the thermal head away from the platen;

the adjusting means comprises a pair of adjusting screws extending from the head frame toward the thermal head; the adjusting screws being spaced apart along the platen direction of extension;

a respective pressure spring being compressed between each adjusting screw and the thermal head, wherein each adjusting screw is turnable for moving the respective pressure spring and the thermal head toward and away from the platen; the adjusting screws acting upon the thermal head through the pressure springs, upon deflection of the elastic means, for adjusting the contact pressure of the thermal head on the printing medium supported on the platen.

5. The thermal head supporting mechanism of claim 1, wherein the head frame extends behind the thermal head at the side of the thermal head away from the platen;

the adjusting means extends from the head frame toward the thermal head and is movable with respect to the head frame for moving the thermal head with respect to the head frame.

6. The thermal head supporting mechanism of claim 1, wherein the control means comprises a lock pin protruding from a side of the head frame and generally along the direction of extension of the platen;

a control lever supported on the body of the printer, the control lever including a side plate extending toward the platen and being formed with a first engagement recess nearer to the platen and a second engagement recess further from the platen; the control lever being movable with respect to the head frame to selectively engage and disengage one of the first and second recesses of the side plate with the lock pin on the head frame, wherein with the lock pin in the first recess, the thermal head is moved in contact the printing medium supported on the platen, and with the lock pin in the second recess, the thermal head is moved away from the platen.

7. The thermal head supporting mechanism of claim 6, further comprising a spring connected with the control lever for biasing the control lever to bring the selected one of the first and second recesses of the side plate into engagement with the lock pin.

8. The thermal head supporting mechanism of claim 7, further comprising a knob attached to the control lever for being grasped to move the control lever recesses out of engagement with the lock pin against the bias of the control lever spring.

9. The thermal head supporting mechanism of either of claims 6 or 8, wherein the control lever is pivotally attached to the body of the printer.

10. The thermal head supporting mechanism of claim 6, wherein there are two of the lock pins protruding from opposite sides of the head frame, and the control lever comprises two of the side plates, one for each of the lock pins; a crossplate securing the side plates to move together; each side plate being provided with respective first and second engagement recesses placed such that the first recesses both simultaneously engage the respective lock pins and the second recesses both simultaneously engage the respective lock pins.

11. The thermal head support mechanism of claim 6, further comprising a knob attached to the control lever for being grasped to move the control lever recesses into and out of engagement with the lock pin.

12. The thermal head supporting mechanism of either of claims 6 or 10, wherein the first and second recesses are defined.in the lower edge of the side plate.

13. The thermal head supporting mechanism of claim 1, wherein the elastic means comprises a leaf spring attached between the head frame and the thermal head and the leaf spring is adapted to permit the thermal head to deflect and tilt with respect to the head frame.

14. The thermal head supporting mechanism of claim 13, wherein the head frame extends behind the thermal head the adjusting means extends from the head frame toward the thermal head and is movable with respect to the head frame for moving the thermal head with respect to the head frame.

15. The thermal head supporting mechanism of claim 13, wherein the head frame is hingedly attached to the body of the printer to pivot with respect to the body for moving the thermal head toward and away from contact with the printing medium supported on the platen.

16. The thermal head supporting mechanism of claim 15, wherein the head frame extends behind the thermal head at the side of the thermal head away from the platen;

the adjusting means extends from the head frame toward the thermal head and is movable with respect to the head frame for moving the thermal head with respect to the head frame.

17. The thermal head supporting mechanism of claim 16, wherein the adjusting means comprises an adjusting screw extending from the head frame toward the thermal head and further comprises a pressure spring compressed between the adjusting screw and the thermal head, wherein the adjusting screw is turnable for moving the pressure spring and thereby for moving the thermal head toward and away from the platen; the adjusting screw acting upon the thermal head through the pressure spring, upon deflection of the elastic means, for adjusting the contact pressure of the thermal head against the printing medium supported on the platen.

18. The thermal head supporting mechanism of claim 17, further comprising an auxiliary roller holder, including an auxiliary leaf spring connected to the head frame; an auxiliary roller rotatably supported to the leaf spring and spaced from the head frame, and the auxiliary leaf spring being for biasing the auxiliary roller against the printing medium supported on the platen.

19. The thermal head supporting mechanism of claim 13, wherein there are a pair of the leaf springs attached to the side of the thermal head facing toward the platen and being spaced apart along the direction of extension of the platen; the leaf springs extending down from the thermal head to two lower ends of the leaf springs, and the lower ends of the leaf springs being fixed to the side of the head frame facing toward the platen.

20. The thermal head supporting mechanism of claim 13, wherein the adjusting means comprises an adjusting screw extending from the head frame toward the thermal head and further comprises a pressure spring compressed between the adjusting screw and the thermal head, wherein the adjusting screw is turnable for moving the pressure spring and thereby for moving the thermal head toward and away from the platen; the adjusting screw acting upon the thermal head through the pressure spring, upon deflection of the elastic means, for adjusting the contact pressure of the thermal head against the printing medium supported on the platen.

21. The thermal head supporting mechanism of claim 13, wherein the head frame extends behind the thermal head at the side of the thermal head away from the platen;

the adjusting means comprises a pair of adjusting screws extending from the head frame toward the thermal head; the adjusting screws being spaced apart along the platen direction of extension;

a respective pressure spring being compressed between each adjusting screw and the thermal head, wherein each adjusting screw is turnable for moving the respective pressure spring and the thermal head toward and away from the platen, the adjusting screw acting upon the thermal head through the pressure spring, upon deflection of the elastic means, for adjusting the contact pressure of the thermal head on the printing medium supported on the platen.

22. The thermal head supporting mechanism of claim 13, further comprising an auxiliary roller holder, including an auxiliary leaf spring connected to the head frame; an auxiliary roller rotatably supported to the leaf spring and spaced from the head frame, and the auxiliary leaf spring being for biasing the auxiliary roller against the printing medium supported on the platen.

23. The thermal head supporting mechanism of claim 1, further comprising an auxiliary roller holder, including an auxiliary leaf spring connected to the head frame; an auxiliary roller rotatably supported to the leaf spring and spaced from the head frame, and the auxiliary leaf spring being for biasing the auxiliary roller against the printing medium supported on the platen.

24. A thermal head supporting mechanism for a thermal printer, wherein the printer comprises a platen supported in position on a body and the platen is for supporting a printing medium as the printing medium is being contacted by a thermal head; the platen extending along a direction;

a thermal head supported on the body and being adapted to be brought into and out of contact with the printing medium supported on the platen;

the thermal head supporting mechanism comprising:

a head frame for supporting the thermal head, the head frame being movable to move the thermal head to contact the printing medium supported on the platen;

an auxiliary roller holder, including an auxiliary leaf spring connected to the head frame;

an auxiliary roller rotatably supported to the auxiliary leaf spring and spaced from the head frame, the auxiliary leaf spring being for biasing the auxiliary roller against the printing medium supported on the platen;

elastic means on the head frame for elastically supporting the thermal head for permitting the tilt orientation of the thermal head to be adjusted with respect to the direction of the extension of the platen for enabling the thermal head to be tilted parallel to the platen;

adjusting means on the head frame for adjusting the tilt orientation of the thermal head with respect to the platen for adjusting the contact pressure of the thermal head against a printing medium supported on the platen;

the adjusting means comprising an adjusting screw extending from the head frame toward the thermal head and further comprising a pressure spring compressed between the adjusting screw and the thermal head, wherein the adjusting screw is turnable for moving the pressure spring and thereby for moving the thermal head toward and away from the platen; the adjusting screw acting upon the thermal head through the pressure spring, upon deflection of the elastic means, for adjusting the contact pressure of the thermal head against the printing medium supported on the platen.

* * * * *